United States Patent
Yasumoto

(10) Patent No.: US 9,114,643 B2
(45) Date of Patent: Aug. 25, 2015

(54) BELT FEEDING DEVICE FOR IMAGE FORMING APPARATUS

(71) Applicant: CANON KABUSHIKI KAISHA, Tokyo (JP)

(72) Inventor: Takeshi Yasumoto, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/141,900

(22) Filed: Dec. 27, 2013

(65) Prior Publication Data

US 2014/0183008 A1 Jul. 3, 2014

(30) Foreign Application Priority Data

Dec. 28, 2012 (JP) ................................ 2012-286634

(51) Int. Cl.
- *B65G 39/16* (2006.01)
- *B41J 11/00* (2006.01)
- *B65G 39/071* (2006.01)

(52) U.S. Cl.
CPC .............. *B41J 11/007* (2013.01); *B65G 39/071* (2013.01)

(58) Field of Classification Search
CPC ......... B65G 39/16; B65G 15/64; B65G 23/44
USPC ............................. 198/806, 807, 813; 399/165
See application file for complete search history.

(56) References Cited

U.S. PATENT DOCUMENTS

| | | | | |
|---|---|---|---|---|
| 3,993,186 A * | 11/1976 | Sokolowski | .................. | 198/806 |
| 5,365,321 A | 11/1994 | Koshimizu et al. | | |
| 5,659,851 A | 8/1997 | Moe et al. | | |
| 6,241,078 B1 * | 6/2001 | Mott | .............................. | 198/806 |
| 6,274,846 B1 * | 8/2001 | Ono et al. | ...................... | 198/808 |
| 7,434,680 B2 * | 10/2008 | Kitamura | ....................... | 198/806 |
| 8,260,182 B2 * | 9/2012 | Taoka | ............................ | 399/302 |
| 8,346,140 B2 * | 1/2013 | Yasumoto | ...................... | 198/804 |
| 8,689,967 B2 * | 4/2014 | Kitamura | ....................... | 198/806 |
| 2010/0158568 A1 * | 6/2010 | Yasumoto | ...................... | 399/165 |
| 2011/0318048 A1 * | 12/2011 | Yasumoto | ...................... | 399/101 |

FOREIGN PATENT DOCUMENTS

| | | |
|---|---|---|
| JP | 05-338843 A | 12/1993 |
| JP | 2007-015858 A | 1/2007 |
| JP | 2012-012136 A | 1/2012 |

* cited by examiner

*Primary Examiner* — James R Bidwell

(74) *Attorney, Agent, or Firm* — Fitzpatrick, Cella, Harper & Scinto

(57) ABSTRACT

A belt feeding device for an image forming apparatus includes a movable endless belt, and a steering unit configured to be tilted for moving the endless belt in a widthwise direction crossing with a moving direction of the endless belt. The steering unit includes a rotatable roller configured to stretch the endless belt and to be rotatable with a movement of the endless belt, a shaft configured to rotatably support the rotatable roller, and a pair of supporting members configured to support the shaft at end portions with respect to the widthwise direction. The supporting members having sliding surfaces respectively for applying frictional forces by sliding relative to an inner surface of the endless belt. In addition, a frame is configured to tiltably support the steering unit.

8 Claims, 8 Drawing Sheets

(a)

(b)

(a)

(b)

BELT FEEDING DEVICE FOR IMAGE FORMING APPARATUS

FIELD OF THE INVENTION AND RELATED ART

The present invention relates to a belt feeding device for feeding an endless belt stretched around a plurality of stretching rollers in an image forming apparatus.

Recently, to meet the demand for speed-up of image formation, an image forming apparatus in which a plurality of image forming stations are provided on an image bearing member such as an endless belt or the like is widely used. An exemplary image bearing member is an intermediary transfer belt in a full-color image forming apparatus of an electrophotographic type, for example.

The intermediary transfer belt travels around stretching rollers to receive toner images suppermposingly and transfer the toner images all together onto a recording material such as a sheet.

Generally, the intermediary transfer belt involves a problem that it shifts in the axial direction during the traveling (feeding) to one end because of an outer diameter accuracy of the stretching roller and/or an alignment accuracy relative to the rollers (belt shift).

Japanese Laid-open Patent Application 2007-15858 and U.S. Pat. No. 5,659,851 proposes an alignment mechanism for an endless belt in which a steering roller is operated to prevent the shifting with an inexpensive structure not requiring an electrical part such as a sensor or an actuator.

In such an alignment mechanism, a sliding member is provided at each of opposite end portions of a tension roller functioning also as a steering roller. The frictional forces between the sliding member and an inner surface of the endless belt at the opposite ends become different from each other in accordance with the shifting amount of the endless belt and with the change of the engaging widths between the sliding member and the endless belt, by which a torque is produced to pivot the steering roller.

Generally, a follower roller which is driven by the endless belt is frequently selected for the stretching roller for the aligning operation, because the behavior in the aligning operation is slow and because the structure is simple. In order to support and stretch the endless belt there are at least two rollers, namely a driving roller and a tension roller which is a driven roller, and therefore, the tension roller is frequently selected for the alignment roller.

With the alignment mechanism using the frictional force, a steering angle required for the alignment cannot be provided when a resisting force exceeds the frictional force. Therefore, as disclosed in the above-described publications, Japanese Laid-open Patent Application 2007-15858 and U.S. Pat. No. 5,659,851, the functions of the tension roller functioning also as the steering roller are divided into the driven roller portion and a non-followable sliding member provided at each of the opposite end portions of the driven roller portion, thus decreasing the resisting force at the driven roller portion.

In Japanese Laid-open Patent Application 2007-15858, at each of opposite end portions of the driven roller portion, the non-followable sliding member fixed to a stage member is provided, and a driven roller shaft extended further to the end of the sliding member is supported by a supporting member so as to be capable of being driven. By this, the bearing function is provided by the shaft supporting member, so that a relation between the sliding member and the driven roller shaft is such that they are not contacted to each other by a hole provided in the sliding member. In addition, by the shaft supporting member being urged by a tension spring, a role of the tension roller is allotted to the driven roller portion.

In U.S. Pat. No. 5,659,851, the driven roller portion includes a roller cylinder portion, a roller shaft extended out of the end portion of the roller cylinder portion and fixed to the stage member, and a ball bearing supporting the roller shaft in the roller cylinder portion. The sliding member provided at each of the opposite end portions of the roller cylinder portion is non-followably fixed to the roller shaft by a parallel pin or the like. The stage member is supported by a rotational center shaft as a swing center for an aligning operation, at a central portion with respect to a longitudinal direction. The tension spring applies a tension force at one point of the rotational center shaft portion together with the stage member.

With structures of Japanese Laid-open Patent Application 2007-15858 and U.S. Pat. No. 5,659,851, the function separation between the driven portion and the non-follower portion and the tension application structure are complicated, and stretching regions of the driven portion and the non-follower portion are distant relative to each other. Therefore, a flexure of a projected portion of the driven roller shaft is so large that the follow property of the driven roller portion is low, and therefore, the alignment performance may be deteriorated. The deterioration of the follow property may cause uneven wearing and/or noise with use. The large distance between the stretching regions requires a large space in the thrust direction, thus upsizing the belt feeding device.

SUMMARY OF THE INVENTION

According to an aspect of the present invention, there is provided a belt feeding device for an image forming apparatus comprising a roller unit for supporting an endless belt, said roller unit including a rotatable member rotatable by being driven by movement of said endless belt, and a pair of shaft supporting members for supporting opposite end portions of said rotatable member with respect to a widthwise direction crossing with a feeding direction of said endless belt, said shaft supporting members being provided with respective sliding surfaces for applying frictional forces by sliding relative to an inner surface of said endless belt; a stretching roller cooperative with said roller unit to support said endless belt; and a supporting mechanism for inclinably supporting said roller unit so as to incline a rotational axis of said rotatable member relative to a rotational axis of said stretching roller by the frictional force.

Further features of the present invention will become apparent from the following description of exemplary embodiments with reference to the attached drawings.

These and other objects, features and advantages of the present invention will become more apparent upon a consideration of the following description of the preferred embodiments of the present invention taken in conjunction with the accompanying drawings.

Figure 2:
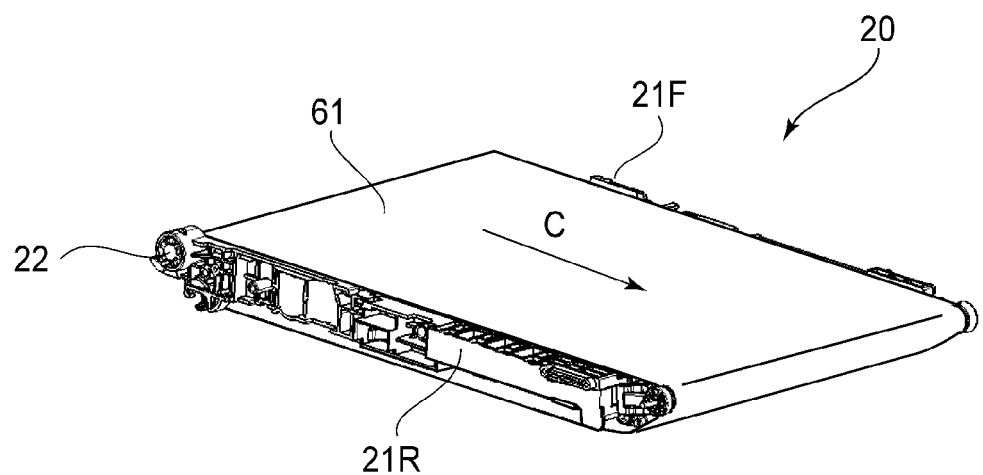
Figure 2:
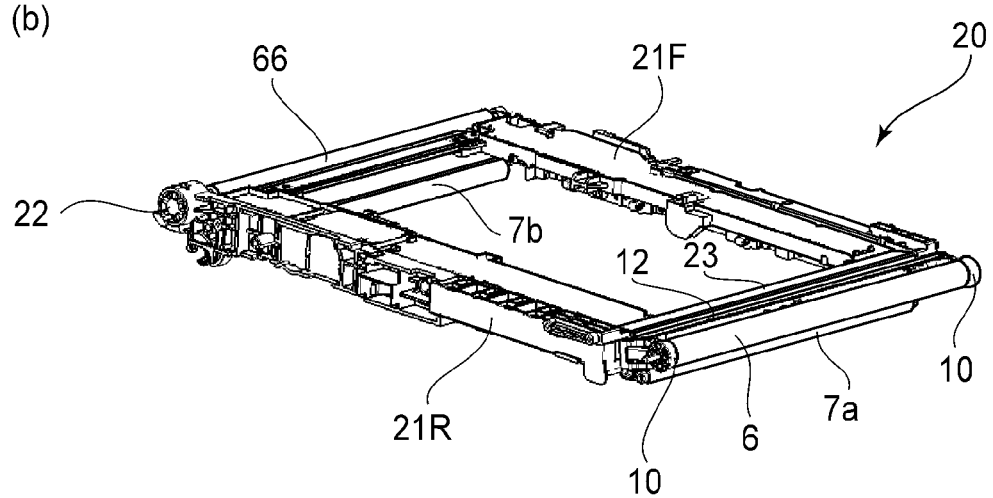

Parts (a) and (b) of FIG. 2 are perspective views illustrating the belt feeding device according to this embodiment.

Figure 3:
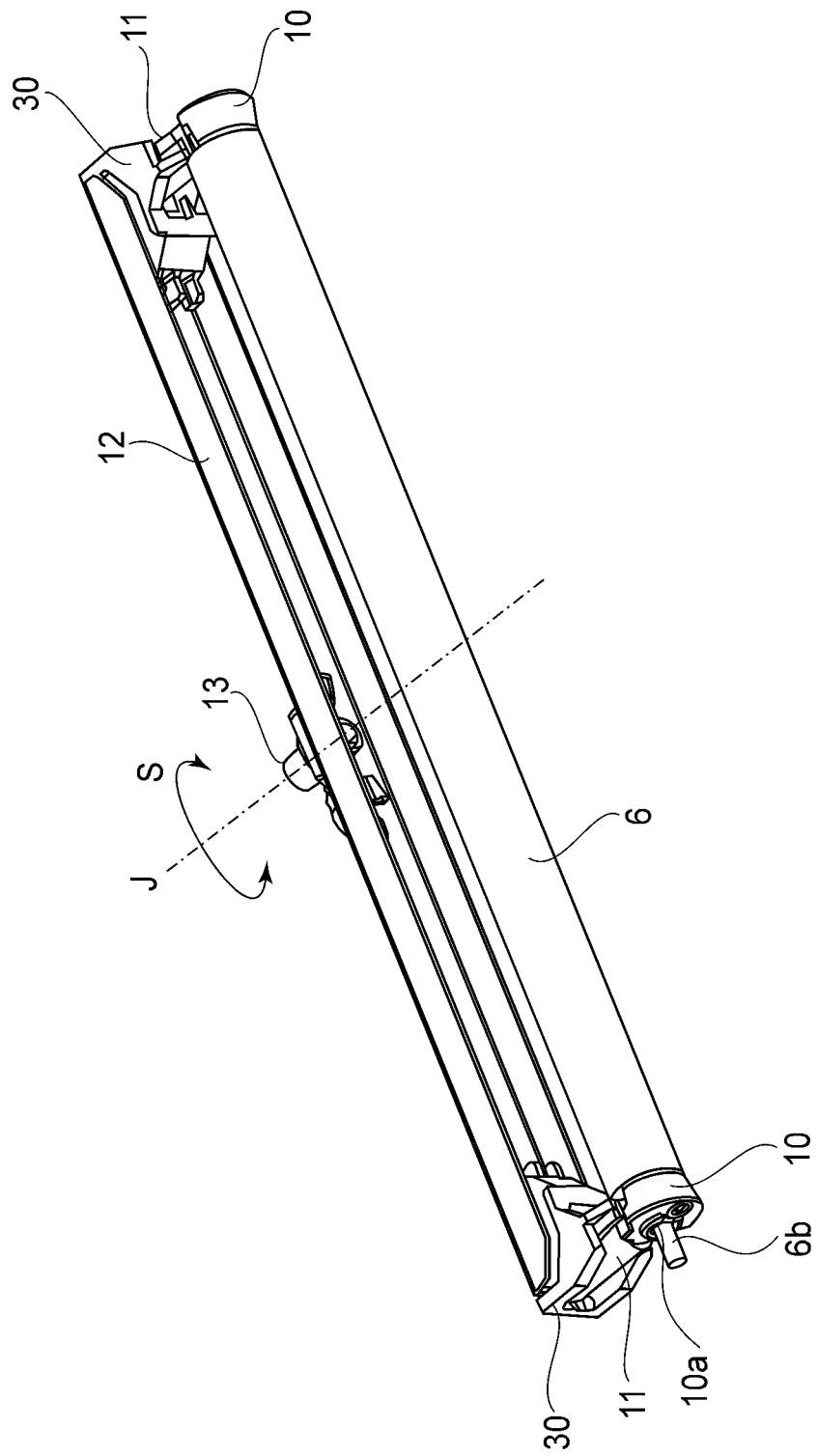

FIG. 3 is a perspective view illustrating a belt automatic alignment mechanism in the embodiment.

Figure 4:
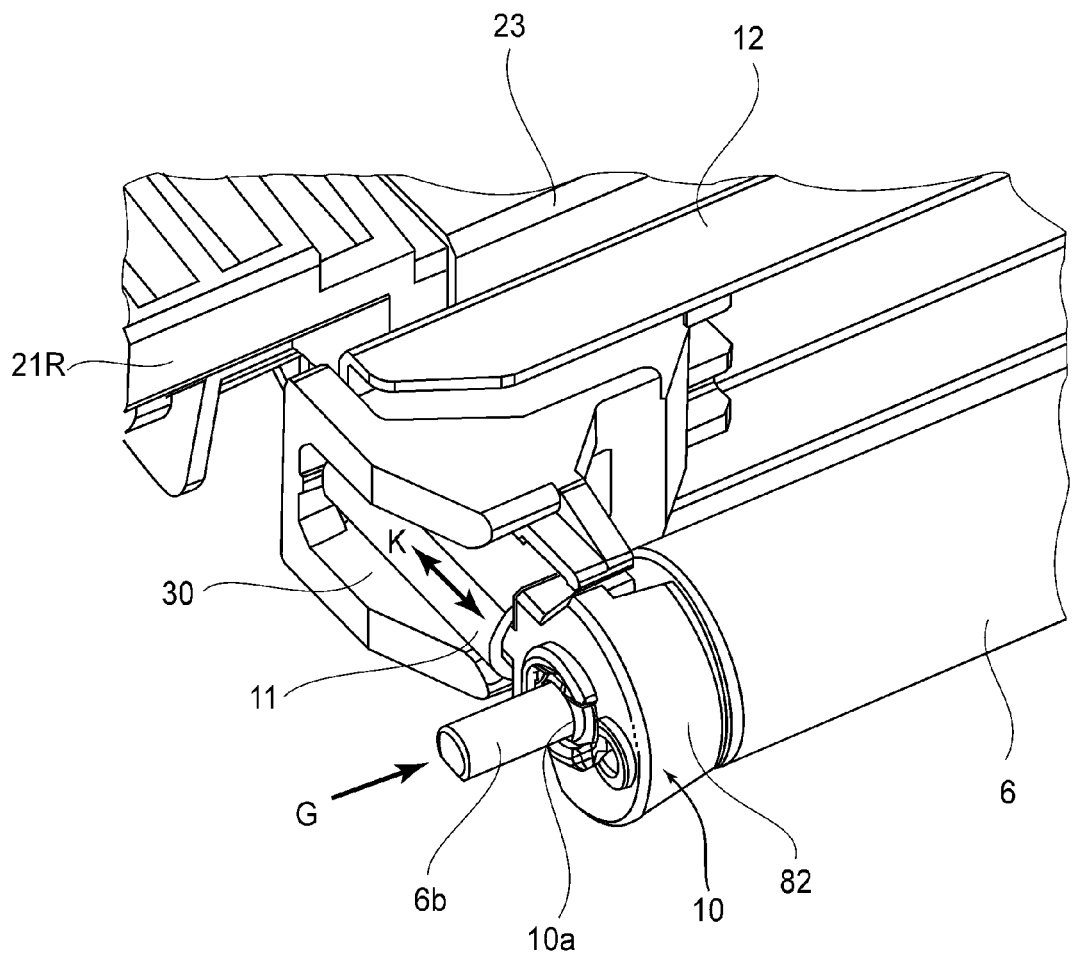

FIG. 4 is an enlarged perspective view illustrating a structure of an end portion of the belt automatic alignment mechanism in this embodiment.

Figure 5:
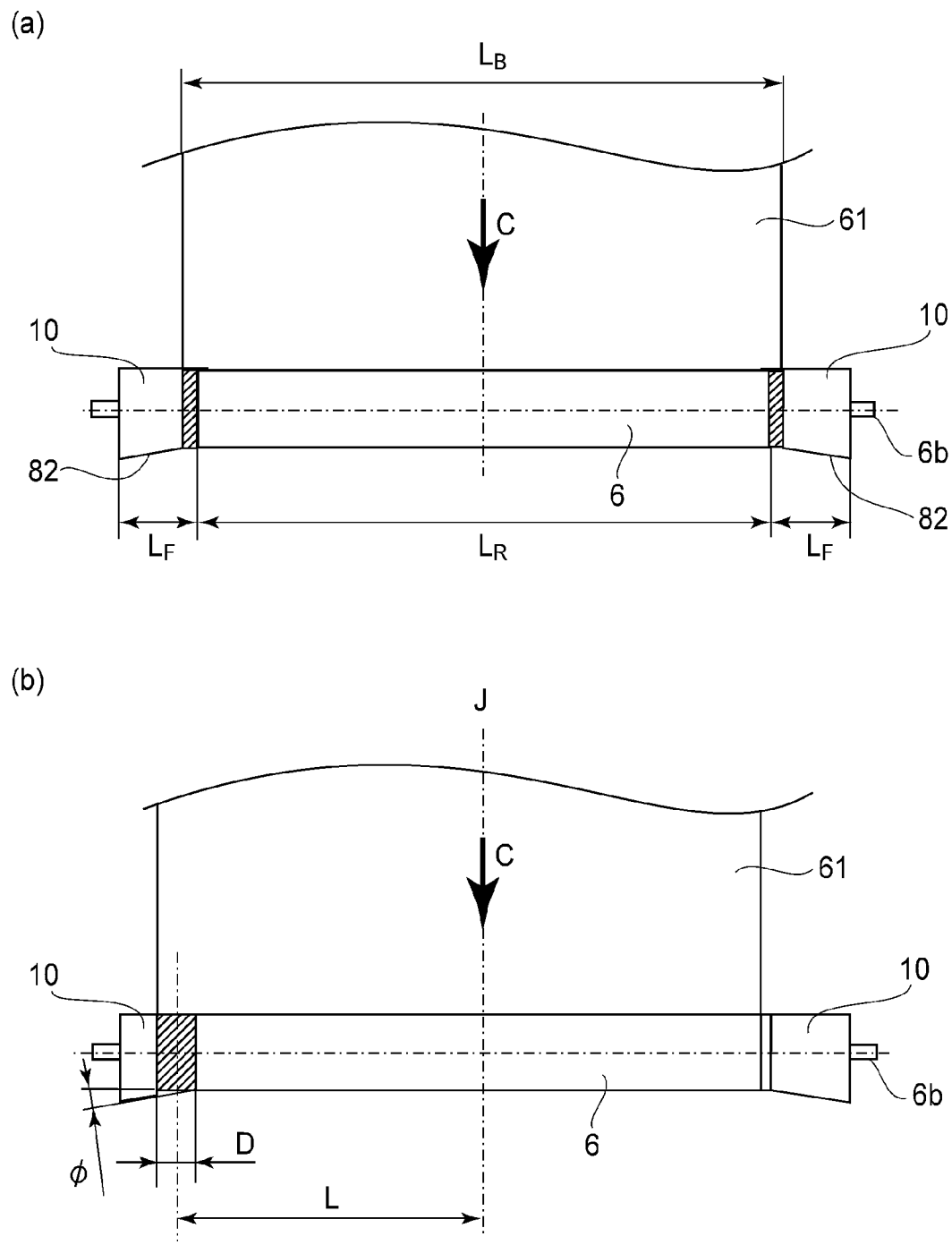

FIG. 5 is a sectional view illustrating a belt alignment principle according to this embodiment.

Figure 6:
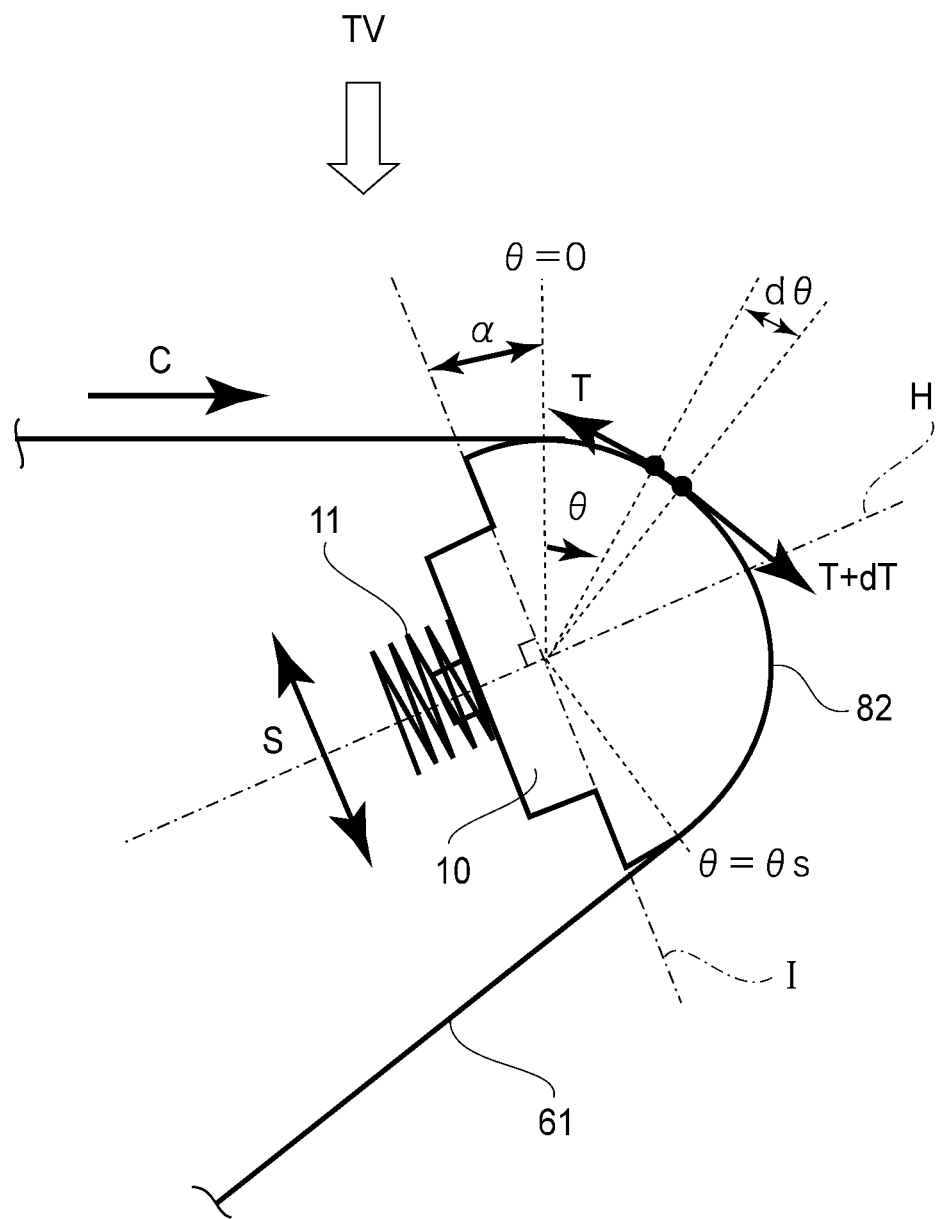

FIG. 6 is a sectional view illustrating a belt training width in this embodiment.

Figure 7:
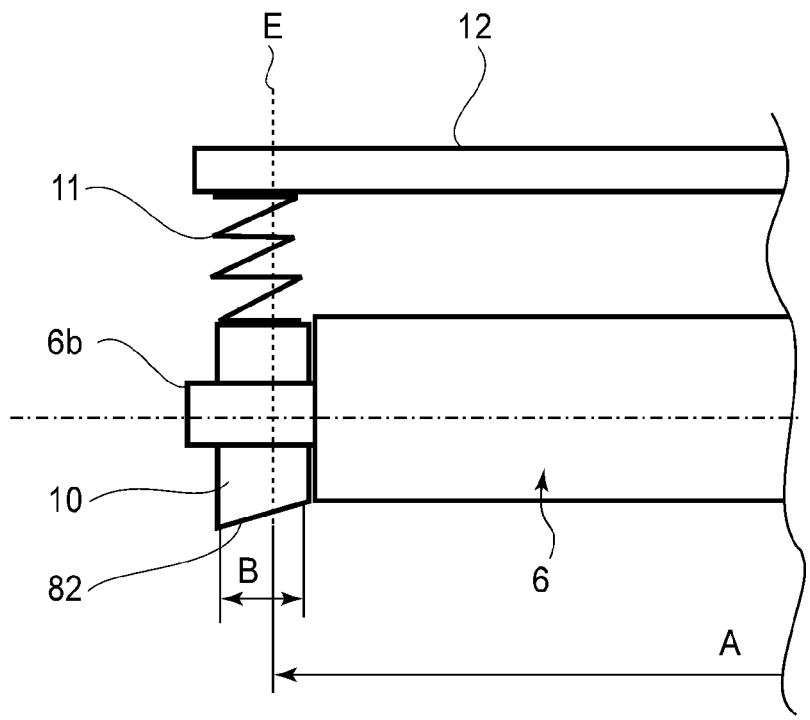

FIG. 7 is a sectional view schematically illustrating a steering roller support portion in this embodiment.

Figure 8:
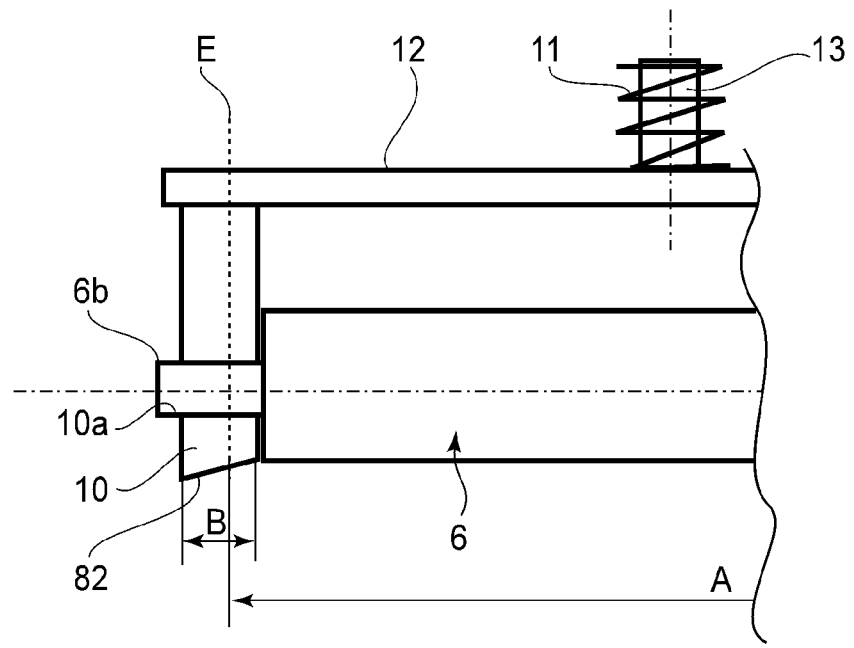

FIG. 8 is a sectional view schematically illustrating the steering roller support portion according to a second embodiment of the present invention.

Figure 9:
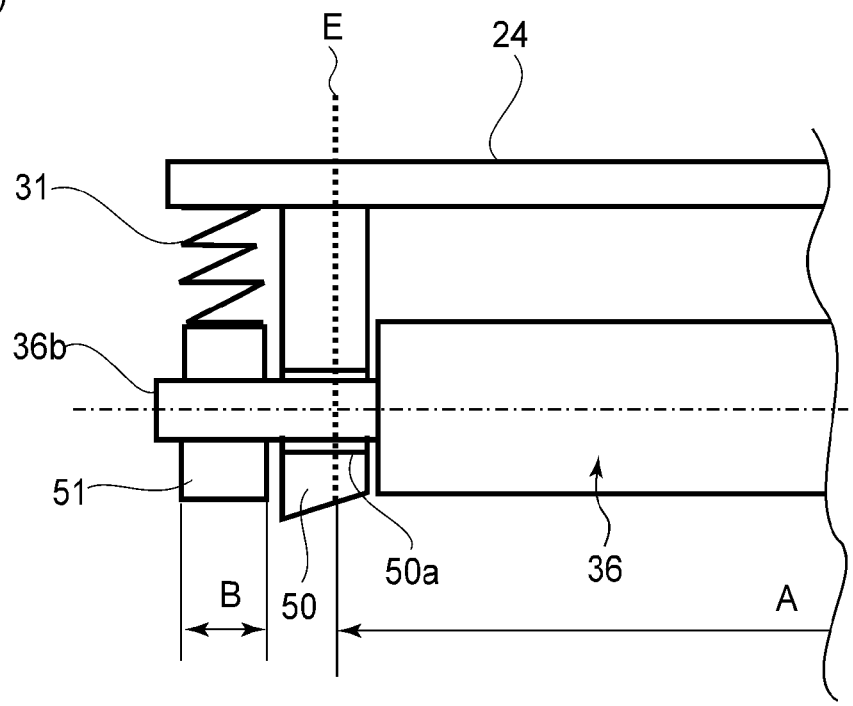
Figure 9:
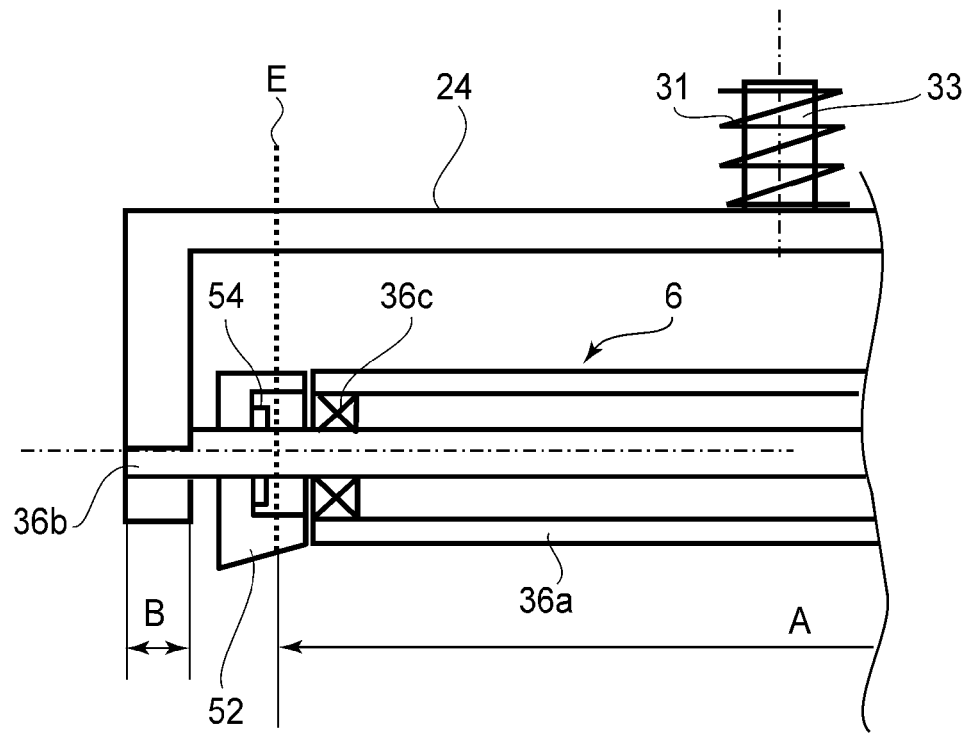

Parts (a) and (b) of FIG. 9 are sectional views illustrating a steering roller support portion in a comparison example.

DESCRIPTION OF THE EMBODIMENTS

First Embodiment

An image forming apparatus using a belt feeding device according to an embodiment of the present invention will be described referring to the drawing. In the description of these embodiments, the same reference numerals are assigned to the elements having the corresponding functions in this embodiment. The belt feeding device may be used for a transfer belt, a belt unit such as a photosensitive belt for image formation process, a belt unit for feeding a recording material such as a sheet, and a fixing unit, which are provided in the image forming apparatus. The image forming apparatus usable with such a belt feeding device may be a copying machine, a printer, a printing machine or the like.

[Image Forming Apparatus 60]

Figure 1:
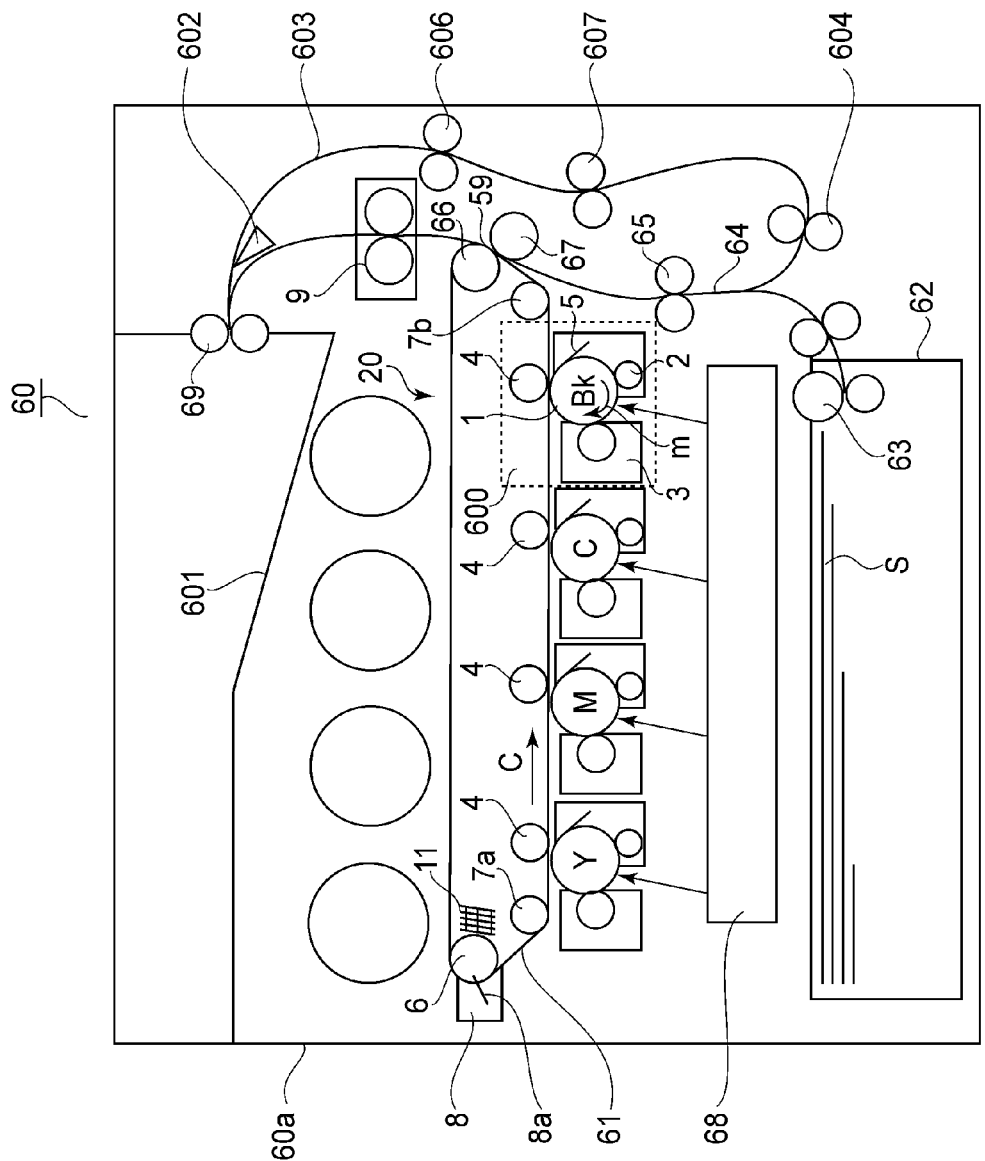
FIG. 1 is a sectional view of an image forming apparatus including a belt feeding device according to a first embodiment of the present invention.

FIG. 1 is a sectional view illustrating a schematic structure of the image forming apparatus 60 according to this embodiment. The image forming apparatus 60 may be of an electrophotographic type, an offset printing type, an ink jet type or the like, but the image forming apparatus 60 shown in FIG. 1 is a full-color image forming apparatus of the electrophotographic type as an exemplary apparatus.

The image forming apparatus 60 comprises a main assembly (main assembly of the apparatus) 60a which includes Y (yellow), M (magenta), C (cyan), and Bk image forming stations 600.

In the image forming apparatus 60, the image forming station 600 are arranged along the intermediary transfer belt 61 (intermediary transfer and tandem type). The intermediary transfer belt 61 is an endless belt is stretched around a driving roller 66 as a second stretching roller, a steering roller 6 as a first stretching roller, and a driven stretching rollers 7a, 7b and is driven in the direction of arrow C in FIG. 1. The driving roller 66 functions as an inner roller for secondary-transfer operation. The steering roller 6 functions also as a tension roller.

Recently, the intermediary transfer and tandem type is widely used because of the advantage in the productivity and capable of use with thick sheets. Each image forming station 600 comprises a drum shape electrophotographic photosensitive member as an image bearing member (photosensitive drum) 1. Although four image forming stations 600 are provided for yellow (Y), magenta (M), cyan (C) and black (Bk), respectively, but the number and the order thereof are not limited to them.

The photosensitive drum 1 as the image bearing member is rotatable in the clockwise direction (arrow m) in FIG. 1. A surface of the photosensitive drum 1 is charged uniformly by a charger 2, and thereafter, an electrostatic latent image is formed thereon by an exposure device 68 driven on the basis of a signal of supplied image information. The electrostatic latent image is visualized into a toner image by a developing device 3. The exposure devices 68 are disposed below the four image forming stations 600, respectively.

Each image forming station 600 comprises mainly the photosensitive drum 1, the charger 2, the developing device 3, a primary transfer roller 4 and a photosensitive member cleaning portion 5 and so on. In the image forming station 600, the toner image on the photosensitive drum 1 is primary-transferred sequentially onto the intermediary transfer belt 61 by a predetermined pressure and electrostatic load bias voltage applied by the primary transfer roller 4 disposed at an inner periphery side (inside) of the intermediary transfer belt 61 (endless belt). Remaining toner remaining on the photosensitive drum 1 after the primary-transfer is removed and collected by the photosensitive member cleaning portion 5 so as to be prepared for the next image forming operation.

In the lower portion of the apparatus main assembly 60a, a recording material storage for accommodating the recording materials S is provided. Downstream of the recording material storage 62 with respect to the sheet feeding direction, a sheet feeder 63 of a type by a sheet feeding roller or the like, for example using a friction separation, is provided. The recording materials S in the recording material storage 62 are picked up one by one by the sheet feeder 63 from the recording material storage and is fed toward a registration roller pair 65.

A leading end of the recording material S is then brought into abutment to the nip of the registration roller pair 65, and a loop of the recording material S is formed to correct oblique feeding. Thereafter, the registration roller pair 65 feeds the recording material S to a secondary transfer portion 59, more particularly, into between the intermediary transfer belt 61 and an outer secondary-transfer roller 67, in synchronism with the toner image on the intermediary transfer belt 61.

The color toner image on the intermediary transfer belt 61 is transferred onto the recording material S by a predetermined pressure and electrostatic load bias voltage in the secondary transfer portion 59 between the driving roller 66 and the outer secondary-transfer roller 67 interposing the intermediary transfer belt 61.

The intermediary transfer belt unit 20 includes a belt feeding device provided with the intermediary transfer belt 61. The remaining toner remaining on the intermediary transfer belt 61 after the secondary-transfer is removed and collected by a cleaning unit 8 provided at a position opposing to the steering roller 6 of the intermediary transfer belt unit 20 to be prepared for the next image formation. The cleaning unit 8 cleans the surface of the intermediary transfer belt 61 by contacting the cleaning blade 8a to the intermediary transfer belt 61.

The toner image transferred onto the recording material S is heated and pressed in fixing device 9 provided downstream of the secondary transfer portion 59 to be fixed, and the recording material is discharged onto the sheet discharge tray 601 through a sheet discharging roller pair 69.

At the righthand side of the secondary transfer portion 59 in the apparatus main assembly 60a, there is provided a both-sided sheet feeding path 603 including a switching member 602, a feeding roller pair 606, 607, a duplex print re-feeding roller 604 and so on.

[Recording Material Feeding Process]

In the recording material storage 62, a stack of the recording materials S are accommodated of a lift-up device. A recording material S in the recording material storage 62 is fed by the sheet feeder 63 in timed relation with the image forming operation. The recording material S fed by the sheet feeder 63 is fed to the registration roller pair 65 through a feeding path 64 in the feeding unit.

The recording material S is subjected to the oblique feeding correction and timing correction by the registration roller pair 65, and then is fed to the secondary transfer portion 59. The secondary transfer portion 59 is a toner image transfer nip for transferring the toner image onto the recording material S and are formed by the driving roller 66 and the outer secondary-transfer roller 67, and it transfers the toner image onto the recording material S by the predetermined pressure and the electrostatic load bias voltage.

[Image Formation Process]

The image forming process on the recording material S before the secondary transfer portion 59 will be described in detail.

The surface of the photosensitive drum 1 rotating in the direction of the arrow m in the FIG. 1 is uniformly charged by the charger 2 and is exposed to the light of the image information by the exposure device 68 on the basis of the image information signal. As described above, the electrostatic latent image formed on the photosensitive drum 1 is visualized into the toner image on the photosensitive drum 1 by the toner development by the developing device 3. Thereafter, it is subjected to the predetermined pressure and the electrostatic load bias by the primary transfer roller 4 so that the toner image is transferred onto the intermediary transfer belt 61.

The steering roller 6 having a tension roller function for applying a predetermined tension to the intermediary transfer belt 61 presses the intermediary transfer belt 61 from the inner surface thereof by a tension spring 11 (compression spring).

In the image forming processes by the image forming stations 600, the toner image is superimposed on an upstream color toner image already primary-transferred onto the intermediary transfer belt 61 by timing control. As a result, finally, the full-color toner image is formed on the intermediary transfer belt 61 and is fed to the secondary transfer portion 59.

[Process Following Secondary-Transfer]

Through the above-described recording material S feeding process and image forming process, the full-color toner image is secondary-transferred onto the recording material S by the secondary transfer portion 59, and then the recording material S is fed to the fixing device 9. In the fixing device 9, the opposing fixing roller or fixing belt form a fixing nip, through which the toner image is fused fixed by a predetermined pressure and heat quantity applied to the recording material S in the fixing nip.

The recording material S now having the fixed image is fed either to the sheet discharge tray 601 or the both-sided sheet feeding path 603 for duplex image formation, by switching of the switching member 602.

In the case of the duplex image formation, the recording material S is feeding temporarily to the sheet discharge tray 601 by the sheet discharging roller pair 69, and at the timing when the trailing edge of the recording material passes the switching member 602, the sheet discharging roller pair 69 is reversely rotated so as to feed the recording material to the both-sided print sheet feeding path 603.

Thereafter, the recording material S is merged into the feeding path 64 by the duplex print re-feeding roller 604 in timed relation with the recording material S of the subsequent job fed by the sheet feeder 63, and then is fed to the secondary transfer portion 59 similarly.

The image forming process on the back side (second side) of the recording material S is the same as that on the front side (first side).

[Steering Structure of Intermediary Transfer Belt 61]

The steering structure of the intermediary transfer belt 61 will be described. FIG. 2 is a perspective view of the intermediary transfer belt unit 20 per se as the belt feeding device shown in FIG. 1. Part (a) of FIG. 2 shows a state in which the intermediary transfer belt 61 is stretched, and part (b) shows a state in which the intermediary transfer belt 61 is removed.

As shown in parts (a) and (b) of FIG. 2, the driving roller 66 and driven stretching rollers 7a and 7b are rotatably supported at the opposite axial ends, between a front frame 21F and a rear frame 21R. The steering roller 6 is rotatably supported through a swing plate 12 by a frame stay 23 extended between the front frame 21F and the rear frame 21R at one end portions of them.

A drive coupling 22 is mounted to one end portion of the driving roller 66 with respect to the axial direction. The drive coupling 22 is connected with an output shaft of the belt driving unit (unshown) to transmit a driving force. The driving roller 66 has a surface of rubber or the like having a relatively high friction coefficient and drives the intermediary transfer belt 61 in the direction of arrow C in part (a) of FIG. 2. In this embodiment, the drive transmitting means is the drive coupling 22, but a gear may be used in place thereof.

In this embodiment, for the intermediary transfer belt 61, an automatic belt alignment mechanism is provided to effect a belt alignment operation by the steering roller 6 maintaining by itself a frictional force balance between the opposite end portions.

Referring to FIG. 3, the automatic belt alignment mechanism will be described. FIG. 3 is a perspective view illustrating the automatic belt alignment mechanism per se in this embodiment.

As shown in FIG. 3, the steering roller 6 functioning also as the tension roller is provided with a roller shaft 6b projecting from each of the opposite axial ends. At the positions opposing to the opposite axial ends of the steering roller 6, shaft supporting members 10 are provided, respectively. At each of the opposite axial ends, the projecting roller shaft 6b is engaged with a supporting hole 10a provided in the shaft supporting member 10, thus being rotatably supported by the shaft supporting member 10.

A pair of shaft supporting members 10 is mounted to the swing plate 12 so as to support the opposite axial end portions of the steering roller 6 as the first stretching roller. Each supporting member 10 for the steering roller 6 is supported by a slide guide 30 mounted to the end of the swing plate 12. Between the shaft supporting member 10 and the slide guide 30, a tension spring 11 (compression spring) is provided.

The swing plate 12 is a swingable member for swingably supporting the steering roller 6 as the first stretching roller to change alignment relative to the driving roller 66 as the second stretching roller. The tension spring 11 constitutes an urging member for applying to the steering roller 6 a tension force to be applied to the inner periphery of the intermediary transfer belt 61. The tension spring 11 of this embodiment includes a pair of spring members for applying a tension force at each of the opposite end portions of swing plate 12 to a pair of shaft supporting members 10.

As shown in FIG. 4, the slide guide 30 is provided with an engagement groove for guiding the shaft supporting member 10 only along a pressing direction (arrow K) of the tension spring 11. Thus, the slide guide 30 constitutes a guiding portion for guiding the pair of shaft supporting members 10 in the urging direction of the tension spring 11. A stopper (unshown) stops the tension spring 11 in the pressing direction to retain the shaft supporting member 10 in the assembly state including only the automatic belt alignment mechanism shown in FIG. 3. With such a structure, the urging forces of the tension springs 11 at the opposite end portions can be transmitted effectively to the corresponding shaft supporting members 10.

In the state that the intermediary transfer belt 61 is stretched by the rollers 66, 6, 7a and 7b as shown in part (a) of FIG. 2, the shaft supporting member 10 moves in the direction of compressing the tension spring 11 in the direction of the arrow K from the position where it is regulated by the stopper to apply a predetermined tension to the intermediary transfer belt 61. In this embodiment, the steering roller 6 functions also as the tension roller, as described above.

The swing plate 12 as the swingable member is provided with a rotational shaft member 13 fixed thereto projecting rearwardly and is provided with slide guides 30 at the opposite end portions. The rotational shaft member 13 rotatably (swingably) supports the swing plate 12 which supports the steering roller 6, by engaging with an engaging portion (unshown) provided on the frame stay 23 (the part (b) of FIG. 2 and FIG. 4) provided in the intermediary transfer belt unit 20.

As shown in FIG. 3, such an automatic belt alignment mechanism is constituted as a steering roller supporting unit supported rotatably in the direction of an arrow S in FIG. 3 relative to the frame stay 23 about a steering axis J passing through the rotational shaft member 13 at the central portion of the swing plate 12.

[Details of Self-Alignment Portion]

The structure of the automatic belt alignment mechanism of this embodiment will be described in detail. FIG. 4 is an enlarged perspective view of the end portion of the automatic belt alignment mechanism of this embodiment.

As shown in FIG. 4, a couple shaft supporting members 10 supporting the roller shaft 6b is provided with a sliding ring portion 82 which is slidable on the inner surface of the intermediary transfer belt 61 so that a force effective to change the alignment for the self-alignment of the intermediary transfer belt 61 is applied to the steering roller 6. The sliding ring portion 82 including sliding surface is tapered such that a distance from an outer peripheral surface of steering roller 6 in the diametrical direction gradually increases as the distance from the steering roller 6 moves outwardly in the axial direction. By this, the function of belt self-alignment can be enhanced. The taper structure is employed also in the shaft supporting member 10 of second embodiment which will be described hereinafter.

In this embodiment, the outer diameter of the steering roller 6 is ϕ16 (16 mm), for example. The shaft supporting member 10 includes a curved surface portion (sliding ring portion 82) having the same diameter ϕ16 in the connecting portion relative to the steering roller 6, and from the curved surface portion, the diameter gradually increases outwardly at a rate of taper angle ψ=10° (part (b) of FIG. 5).

In this embodiment, the dimension of the intermediary transfer belt 61 in the widthwise direction perpendicular to the feeding direction (arrow C of FIG. 5) of the intermediary transfer belt 61 is extended so as to partly contact the region of the curved surface having the taper angle ψ. The shaft supporting member 10 is, as described hereinbefore, free only in the direction of the arrow K of FIG. 4 through the slide guide 30. The shaft supporting member 10 is not driven in the feeding direction of the intermediary transfer belt 61 (arrow C) but simply slides relative thereto.

[Operation Principle of Belt Self-Alignment]

The operation principle of the belt self-alignment by the frictional force in the sliding will be described in detail. FIG. 6 schematically shows a section of the intermediary transfer belt 61 winding on the shaft supporting member 10 as seen in the direction of an arrow G.

As described hereinbefore, the shaft supporting member 10 is supported so as not to be driven by the intermediary transfer belt 61, and therefore, it always receives the frictional resistance during the feeding movement of the intermediary transfer belt 61.

In FIG. 6, the intermediary transfer belt 61 driven in the direction of the arrow C wraps on the curved surface portion (sliding ring portion 82) of the shaft supporting member 10 over the range of a wrapping angle θS. Here, as regards the width (in the direction perpendicular to the sheet of the drawing of the recording material S), a unit width is taken.

Taking a belt length corresponding to an infinitesimal wrapping angle dθ in the wrapping angle θ, a tension T is applied to the upstream (loose side), and a tension T+dT is applied to the downstream side (tension side), both along the tangent line. Therefore, in the infinitesimal belt length, the force applied by the intermediary transfer belt 61 toward the center of the shaft supporting member 10 is approximated as Tdθ, and the frictional force dF is as follows when the friction coefficient of the sliding ring portion 82 of the shaft supporting member 10 is μS:

$$dF = \mu_s T d\theta \quad (1)$$

Here, the tension T is determined by the driving roller 66 (FIG. 1), and when the surface of the driving roller 66 has a friction coefficient μr, it is as follows:

$$dT = -\mu_r T d\theta \quad (2)$$

That is, $$\frac{dT}{T} = -\mu_r d\theta \quad (3)$$

By integration of (3) over the wrapping angle θS, the tension T is, When Tl is the tension at θ=0, $$T = T_l e^{-\mu_r \theta} \quad (4)$$

From (1) and (4), $$dF = \mu_s T_l e^{-\mu_r \theta} d\theta \quad (5)$$

As has been described in conjunction with FIG. 3, a swing direction (rotation or pivoting direction) of the automatic belt alignment mechanism about the steering axis J is the arrow S of FIG. 6, the wrapping starting position (θ=0) has a biased angle α relative to the rotating direction (arrow C). Therefore, a downward component of the force given by equation (5) is as follows:

$$dF_s = \mu_s T_l e^{-\mu_r \theta} \sin(\theta + \alpha) d\theta \quad (6)$$

By integration of (6) over the wrapping angle θS, the downward force (arrow S) applied by the intermediary transfer belt 61 to the shaft supporting member 10 per unit width during the belt feeding operation is obtained as equation (7). Reference character H in FIG. 6 is a normal line of the sliding ring portion 82 passing through the center of the shaft supporting member 10 along the direction of the arrow K of FIG. 4, and reference character I is a line perpendicular to the normal line H.

$$F_s = \mu_s T_l \int_0^{\theta_s} e^{-\mu_r \theta} \sin(\theta + \alpha) d\theta \quad (7)$$

FIG. 5 is top plan views as seen in the direction of an arrow TV in FIG. 6, and part (a) of FIG. 5 illustrates a stable state in which the intermediary transfer belt 61 is aligned with the center portion (nominal engaged position) in the balanced state by the self-alignment.

Part (b) FIG. 5 shows the state that the belt shift to the left side when the intermediary transfer belt 61 is driven in the direction of the arrow C.

In this embodiment, as shown in part (a) of FIG. 5, a width LB of the intermediary transfer belt 61 is longer than a width LR of the steering roller 6 measured in the axial direction and is shorter than a width LR+2LF measured between the opposite end portions of the shaft supporting member 10. In the nominal state, the intermediary transfer belt 61 slides engaging (contacts) with each of the shaft supporting members 10 over a predetermined engaging width (2 mm in this embodiment).

In the state shown in part (b) of FIG. 5, the engaging width between the intermediary transfer belt 61 and the shaft supporting member 10 is so uneven that only the left side has the engaging width D.

In this state, the shaft supporting member 10 receives the downward force (S direction) of FSD at the left side and 0 at the right side. Such a frictional force difference between the opposite end portions produces a moment FSD about the steering axis J (downward at the left side in the example of part (b) of FIG. 5).

The positional relation between the intermediary transfer belt 61 and the pair of shaft supporting members 10 in the state that the intermediary transfer belt 61 is aligned with the center portion of the steering roller 6 with respect to the axial direction as shown in part (a) of FIG. 5 is as follows. The opposite widthwise end portions of the intermediary transfer belt 61 are on the parts of the respective sliding surface (sliding ring portions 82) of the shaft supporting members 10.

The moment about the steering axis J will be called "steering torque".

The direction of the steering angle of the steering roller 6 provided by the above-described principle is in the direction of canceling the shifting of the intermediary transfer belt 61, and therefore, a self-alignment effect is provided. In this embodiment, the shaft supporting member 10 is provided with the taper angle ψ so that a relatively low friction coefficient μS is used, the device is durable against the long term use (less wearing), and that an abrupt steering operation can be avoided.

Particularly in the case of an endless belt such as an intermediary transfer belt 61 which is concerned with the image formation, an abrupt steering operation may result in a positional deviation in the main scan direction (color misalignment, in the case of the color image forming apparatus 60 shown in FIG. 1). Therefore, the friction coefficient μS is preferably selected to be a proper level.

The satisfactory results can be provided when the material of the shaft supporting member 10 is resin material such as POM (polyacetal) exhibiting a slidability, and the friction coefficient μS is approx. 0.3, and the taper angle ψ is 5-10°. Furthermore, in view of an electrostatic problem due to a triboelectric charge with the intermediary transfer belt 61, the shaft supporting member 10 preferably has an electroconductivity.

The dimensional relation in the widthwise direction between the intermediary transfer belt 61 and the shaft supporting member 10 described in conjunction with part (a) of FIG. 5 is intended to avoid abrupt steering operation which may result in the color misregistration in the main scan direction. This is because the dimensional relation of part (a) of FIG. 5 is capable of always detecting the unbalance of the frictional force, and therefore, the aligning operation can be effected substantially in real time.

Referring to parts (a) and (b) of FIG. 9, the structures of the tension roller portions in comparison examples 1 and 2 will be described.

Comparison example 1 shown in part (a) of FIG. 9 corresponds to Japanese Laid-open Patent Application 2007-15858. As shown in part (a) of FIG. 9, the opposite end portions of the driven roller portion 36 are provided with respective sliding members 50 fixed to the stage member 24 so as not to be driven, and roller shafts 36b extended from the opposite end portions of the sliding member 50 are supported by shaft supporting members 51 so as to be driven.

With such structures, the bearing function is performed by the shaft supporting member 51, and therefore, the relation between the sliding member 50 and the driven roller shaft 36b is such that they do not contact each other by the provisions of the holes 50a provided in the sliding member 50. The shaft supporting member 51 is urged downwardly by the tension spring 31 so that the driven roller portion 36 functions as the tension roller. The broken lines E in the in Figure depict the position of the free end of the belt, and the belt stretched range A and the support region B are separated from each other.

Comparison example 2 shown in part (b) of FIG. 9 corresponds to U.S. Pat. No. 5,659,851. As shown in part (b) of FIG. 9, the driven roller portion 36 includes a cylindrical roller cylinder portion 36a, roller shafts 36b projecting from the opposite end portions of the roller cylinder portion 36a, respectively, a ball bearing 36c supporting the roller shaft 36b in the roller cylinder portion 36a. The sliding members 52 provided in at the opposite end portions of the roller cylinder portion 36a are fixed to the roller shaft 36b by parallel pins 54 or the like so as not to be driven. The end portion of the roller shaft 36b extended through the sliding member 52 has a D cut shape to be fixed to the shaft of the stage member 24 so as to be non-rotatable to each other.

The stage member 24 is supported by a rotational center shaft 33 as a swing center of the aligning operation at the central portion with respect to the longitudinal direction. The tension spring 31 applies the tension force for each stage member 24 at one point in the portion of the rotational center shaft 33. The broken line E in the Figure indicating the position of the end portion of the belt, and similarly to part (a) of FIG. 9, the belt stretched range A and the support region B are separated from each other.

As will be understood, with the structures of the comparison examples 1 and 2 shown in parts (a) and (b) of FIG. 9, the function separation structure between the driven portion and the non-driven portion and the tension application structure are complicated, and therefore, the support region B is distant from the belt stretched range A. Therefore, the flexure of the driven roller shaft 36b is large, and the follow property of the driven roller portion 36 is low with the result of deterioration of the alignment performance.

The deterioration of the follow property may be a factor causing durability problems including uneven wearing and noise with time of use. With the structure in which the belt stretched range A and the support region B are separated from each other, a larger space is required in the thrust direction, thus upsizing the belt feeding device in the width direction.

[Specific Effects of this Embodiment]

As compared with comparison examples 1 and 2, this embodiment provides the following advantageous effects. FIG. 7 is a schematic sectional view of the support portion for the steering roller 6 in above-described embodiments.

As described hearing before, the steering roller 6 is supported by the roller shafts 6b being supported by the shaft supporting member 10 so that it can be driven, and the engaging width is a (support region B) in FIG. 7. On the contrary, in the nominal position of the intermediary transfer belt 61, the end portion is at the position of the broken line E, and the belt width A (belt stretched range A) is in an overlapping relation with the width B.

In the state that the intermediary transfer belt 61 is aligned with the center of the steering roller 6 with respect to the axial direction (part (a) of FIG. 5), the couple of tension springs 11 are at least partly overlapped with the end portions of the intermediary transfer belt 61 as seen in the urging direction thereof. By this, the urging force of the tension spring 11 can be applied stably to the intermediary transfer belt 61 through the shaft supporting member 10.

Because of this feature, the amount of flexure of the steering roller 6 is reduced, so that the deterioration of the follow property of the roller shaft 6b in the width B (support region B) and the uneven wearing and/or noise which may result from long term operation can be reduced.

As shown in FIG. 7, the shaft supporting member 10 is provided with a pressing surface for the tension spring 11 at the position opposing the tapered surface on which the intermediary transfer belt 61 wraps. By this, the rigidity of shaft supporting member 10 is enhanced so that the close-contactness of the wrapping belt on the tapered surface is improved.

As shown in FIG. 7, the tension spring 11 overlaps the end portion E of the intermediary transfer belt 61 when the intermediary transfer belt 61 is at the nominal (center). Therefore, when the belt offset occurs, the tension spring 11 at the side to which the belt shifts, the overlapping amount relative to the belt end portion E increases.

In this embodiment, the intermediary transfer belt 61 is made of resin material such as polyimide. The tension springs 11 provided at the opposite end portions expands and contracts to absorb the circumferential length change of the end portions of the belt so that the belt is not broken when the aligning operation is carried out to correct the belt shifting.

In this case, if an unintentional moment is applied to the shaft supporting member 10, the linearity of the belt circumferential length change absorbing operation may be adversely affected, and the responsivity may be deteriorated. According to this embodiment, however, the tension spring 11 and the belt end portion E are overlapped by a predetermined amount, and the overlapping amount increases with the belt offset, and therefore, no unnecessary moment is not applied. As a result, rigidity is enhanced so that the belt circumferential length change absorbing function is satisfactory.

In this manner, according to this embodiment, the rigidity against the belt tension can be enhanced by a simple structure, and a belt alignment mechanism with suppressed loss of the alignment performance can be accomplished.

As regards the widthwise direction size, it can be reduced as compared with that in the alignment mechanism of the comparison examples (parts (a) and (b) of FIG. 9) since the shaft supporting member 10 is provided with the bearing function with friction generation function. Even as compared with the structure not having the alignment mechanism as when the tension roller is supported directly by the prior and rear frames, the size can be equivalent.

In this embodiment, the shaft supporting member 10 has the functions of the sliding member 50 and the sliding member 52 of FIG. 9, and the shaft supporting member 10 is provided adjacent to the steering roller 6. The support region B of the roller shaft 6b of the steering roller 6 and the belt stretched range A of the intermediary transfer belt 61 are overlapped with each other.

By this, the flexure amount of the roller shaft 6b of the steering roller 6 is decreased so that the follow property of the steering roller 6 which is a driven roller is made satisfactory.

Therefore, the loss of the alignment performance and the biased wearing and/or noise of the shaft supporting member 10 can be reduced. Since the shaft supporting member 10 has the bearing function and the frictional force generation function, the structure is simplified, and the width size in the longitudinal direction of the intermediary transfer belt unit 20 as the belt feeding device can be reduced. These effects apply to the second embodiment which will be described hereinafter.

In this embodiment, an image forming apparatus 60 having the intermediary transfer belt 61 has been taken as a example, but the present invention is applicable to another endless belt feeding device and to an image forming apparatus including the endless belt feeding device. For example, the present invention is applicable to a transfer belt unit for attracting the recording material onto which the respective color images are sequentially superimposed, and the image forming apparatus provided with such a transfer belt. In a further example, the present invention is applicable to a photosensitive member belt unit which is directly subjected to the charging, exposure and the development process and images of respective colors are superimposed.

The material, the friction coefficient $\mu S$, the taper angle $\psi$ or the like described above are only examples, and the present invention is not limited to them.

Second Embodiment

A second embodiment according to the present invention will be described. In the description of this embodiment, the same reference numerals as in Embodiment 1 are assigned to the elements having the corresponding functions in this embodiment, and the detailed description thereof is omitted for simplicity.

[Automatic Belt Alignment Mechanism and Effect in this Embodiment]

FIG. 8 is a sectional view illustrating schematically a steering roller support portion according to the second embodiment. It is a sectional view of the automatic belt alignment mechanism of this embodiment which is different from the first embodiment in that the tension spring 11 for applying the belt tension (tension force) is provided only in the central portion of the swing plate 12 in this embodiment.

A rotational shaft member 13 providing the steering axis J the FIG. 3) is fixed to the central portion of the swing plate 12, and an inner diameter of the tension spring 11 is engaged with an outer diameter of the rotational shaft member 13. One end portion of the tension spring 11 is received by a frame stay 23 (FIG. 4) to which the rotational shaft member 13 is mounted, and the other end portion thereof is received by the swing plate 12, so that the entirety of the alignment mechanism is pressed by the tension spring 11.

In this manner, the swing plate (swingable member) 12 is provided with the rotational shaft member 13 as a swing center shaft supporting the steering roller 6 so that the swing plate swings about the central portion of the steering roller 6. The tension spring 11 as the urging member comprises one spring member which is mounted to the rotational shaft member (swing center shaft) 13 to apply the tension force to the steering roller 6 through the rotational shaft member 13 and a pair of shaft supporting members 10.

In the case that the tension forces are applied at two end positions as in the first embodiment, it may be that one of the actual dimensions of the tension springs 11 is an upper limit of the tolerance, and the other is the lower limit of the tolerance, and therefore, a belt offset factor attributable to such a different has to be taken into account. This is not a problem in this embodiment because the tension force is applied at one position (central portion).

In the support structure for the steering roller 6 in this embodiment, the shaft supporting member 10 having a supporting hole 10a engaged with the roller shaft 6b is directly fixed to the swing plate 12, and therefore, the rigidity of the end portions of the alignment mechanism is further enhanced.

Similarly to the first embodiment, the configuration of the shaft supporting member 10 in this embodiment has an inside with a curved surface configuration of the same outer diameter as the adjacent steering roller 6, and the diameter increases toward the outside with a predetermined taper angle ψ. The taper surface (sliding ring portion 82) slides relative to the inner surface of the intermediary transfer belt 61.

In this embodiment, the belt stretched range A of the intermediary transfer belt 61 is similar to that of the first embodiment fundamentally, that is, it partly overlaps the support region B of the shaft supporting member 10. By doing so, the amount flexure of the steering roller 6 is reduced, so that the deterioration of the follow property of the roller shaft 6b in the width B (engaging width), the uneven wearing and/or noise which may result from long term operation can be reduced.

In this embodiment, an image forming apparatus having the intermediary transfer belt 61 has been taken as a example, but the present invention is applicable to another endless belt feeding device and to an image forming apparatus including the endless belt feeding device.

According to the present invention, the support region of the axis of the first stretching roller and the stretched range of the endless belt are overlapped with each other, and therefore, the flexure amount of the axis of the first stretching roller can be decreased, and the follow property of the first stretching roller which is the driven roller is satisfactory. Therefore, the loss of the alignment performance and the biased wearing and/or noise of the shaft supporting member can be reduced. Since the shaft supporting member has the bearing function and the frictional force generation function, the structure is simplified, and the width size in the longitudinal direction of the intermediary transfer belt unit 20 as the belt feeding device can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 286634/2012 filed Dec. 28, 2012 which is hereby incorporated by reference.

What is claimed is:

1. A belt feeding device for an image forming apparatus, comprising:
   a movable endless belt;
   a steering unit configured to be tilted for moving said endless belt in a widthwise direction crossing with a moving direction of said endless belt,
   said steering unit including,
   a rotatable roller configured to stretch said endless belt and to be rotatable with a movement of said endless belt,
   a shaft configured to rotatably support said rotatable roller, and
   a pair of supporting members configured to support said shaft at end portions with respect to the widthwise direction, said supporting members having sliding surfaces respectively for applying frictional forces by sliding relative to an inner surface of said endless belt; and
   a frame configured to tiltably support said steering unit.

2. A belt feeding device according to claim 1, wherein said endless belt partly overlaps with both of said sliding surfaces when a center portion position of said endless belt with respect to the widthwise direction is at a center of said rotatable roller.

3. A belt feeding device according to claim 1, said steering unit further comprising a steering unit frame configured to support said shaft supporting members.

4. A belt feeding device according to claim 1, wherein each of said sliding surfaces is tapered so that a distance from a rotational axis of said rotatable roller increases toward outward ends of each sliding surface.

5. A belt feeding device according to claim 3, further comprising an urging member configured to urge said rotatable roller for applying a stretching force for stretching said endless belt.

6. A belt feeding device according to claim 1, wherein said steering unit is rotated by the frictional forces in a direction of a rotational axis crossing with a direction of said shaft, the rotational axis is disposed adjacent to a widthwisely central portion of said steering unit.

7. A belt feeding device according to claim 5, said steering unit frame further comprising a guiding portion for guiding said supporting member in an urging direction of said urging member.

8. An image forming apparatus comprising:
   the belt feeding device according to claim 1; and
   a toner image forming portion for forming a toner image on said endless belt.

* * * * *